United States Patent [19]
Webb

[11] Patent Number: 5,110,069
[45] Date of Patent: May 5, 1992

[54] SINGLE PIVOT OVERWING THRUST REVERSER

[75] Inventor: George Webb, Cincinnati, Ohio

[73] Assignee: General Electric Company, Cincinnati, Ohio

[21] Appl. No.: 620,597

[22] Filed: Nov. 30, 1990

[51] Int. Cl.$^5$ .............................................. B64D 33/04
[52] U.S. Cl. ............................... 244/110 B; 60/226.2; 239/265.29
[58] Field of Search ................ 244/110 B, 12.5, 23 D; 239/265.19, 265.27, 265.29, 265.31, 265.37, 265.41; 60/226.2, 230, 229

[56] References Cited

U.S. PATENT DOCUMENTS

| | | | |
|---|---|---|---|
| 3,532,275 | 10/1970 | Hom et al. | |
| 3,863,867 | 2/1975 | Souslin et al. | 244/12 D |
| 3,874,620 | 4/1975 | Kahler et al. | 244/110 B |
| 3,877,663 | 4/1975 | Curran et al. | 244/110 B |
| 3,907,224 | 9/1975 | Stearns | 244/110 B |
| 3,915,415 | 10/1975 | Pazmany | 244/110 B |
| 3,917,198 | 11/1975 | Sanders | 244/110 B |
| 3,936,017 | 2/1976 | Blythe et al. | 244/110 B |
| 3,981,463 | 9/1976 | Pazmany | 244/110 B |
| 4,030,687 | 6/1977 | Hapke | 244/12.5 |

Primary Examiner—Joseph F. Peters, Jr.
Assistant Examiner—Carla Mattix
Attorney, Agent, or Firm—Jerome C. Squillaro; James P. Davidson

[57] ABSTRACT

A thrust reverser is provided for a gas turbine engine and exhaust nozzle supported by an aircraft wing, the exhaust nozzle having an outlet for discharging exhaust gases over an outer surface of the wing. The thrust reverser in accordance with a preferred embodiment includes a deflector having forward and aft ends, and first and second sides joined together by a base. The deflector is positionable in a stowed position around the exhaust nozzle so that the aft end is disposed forward of the nozzle outlet for allowing substantially unobstructed discharge of the exhaust gases from the nozzle outlet, and in a deployed position for changing direction of the exhaust gases for thrust reversal. A torque bar is fixedly joined to the first and second deflector sides and has a longitudinal centerline axis. The torque bar is rotatably joined to the wing, and the deflector is rotated about the torque bar centerline axis for being positioned in the deployed and stowed positions.

37 Claims, 9 Drawing Sheets

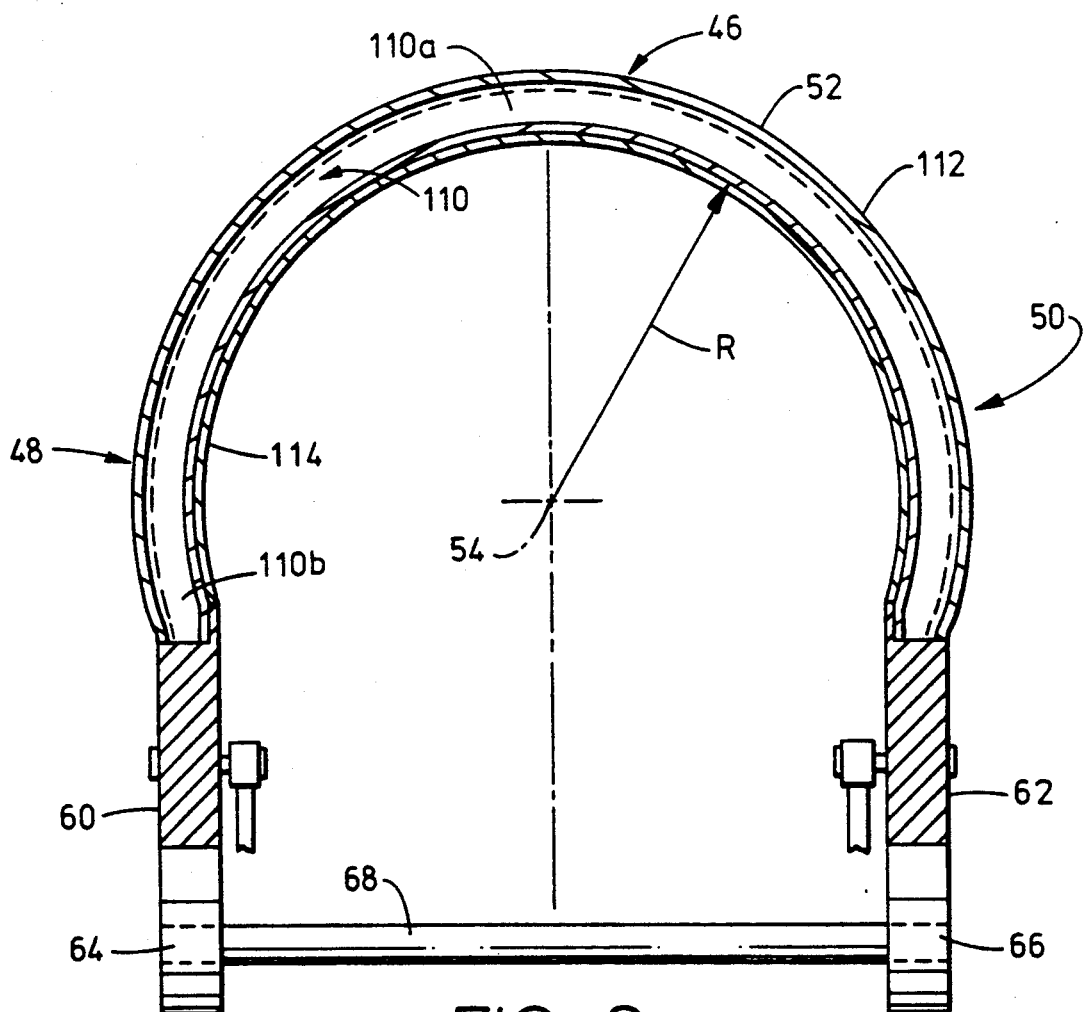
FIG. 8
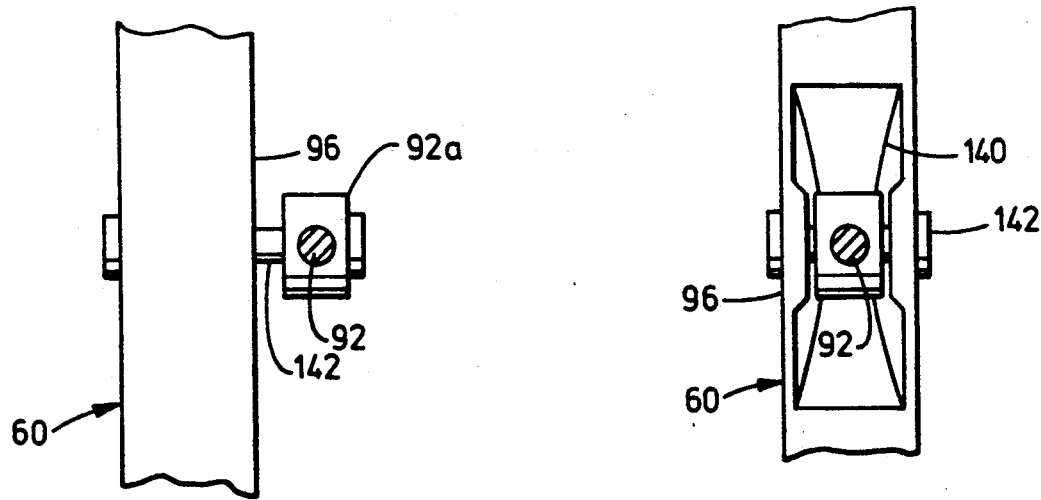
FIG. 11
FIG. 12

5,110,069

SINGLE PIVOT OVERWING THRUST REVERSER

TECHNICAL FIELD

The present invention relates generally to thrust reverser assemblies for aircraft gas turbine engines, and, more specifically, to a thrust reverser for an over-the-wing gas turbine engine including an exhaust nozzle.

BACKGROUND ART

Conventional thrust reversers for aircraft gas turbine engines are provided for deflecting exhaust gases discharged from the engine in a generally forward direction upon landing of an aircraft for assisting in braking the aircraft. The thrust reverser is typically designed to translate from a stowed position, wherein it is aerodynamically blended with a conventional nacelle surrounding the engine, to a deployed position spaced rearwardly of the engine exhaust nozzle so that the exhaust gases are turned forwardly while avoiding back pressure in the exhaust gases which would affect performance of the engine.

Target-type thrust reversers for underwing or fuselage mounted engines typically include a pair of symmetrical deflector doors, or deflectors, for providing thrust reversal. In an overwing mounted gas turbine engine, conventional thrust reversers are typically unsymmetrical and must function within a relatively confined area between the engine and the wing. There are several types of conventional target-type overwing thrust reversers which utilize one or more deflectors and various actuators, linkages, and cam slots for positioning the deflectors between stowed and deployed positions.

The required travel of the deflector between the stowed and deployed positions is typically relatively large, thus requiring suitable actuators and linkages. The actuators and linkages must be suitably coordinated for ensuring effective deployment of the deflector without undesirable cocking thereof. Thrust reversers utilizing such actuators and linkages are sometimes referred to as semi-floating thrust reversers since the deflector is supported, translated and rotated at several joints. Such a thrust reverser is relatively complex and subject to wear at the various joints.

Conventional thrust reversers also utilize at least two deflector doors for obtaining thrust reversal in order to obtain a relatively large change in direction of the exhaust gas flow with relatively short actuator strokes and rotation of the individual doors, for example. Such multidoor thrust reversers add to the complexity of the thrust reverser assembly and, therefore, are generally less desirable.

Conventional overwing thrust reversers also include actuation mechanisms which are disposed either adjacent to the wing outer surface, or within the aircraft wing itself, or both, which is generally undesirable for serviceability and since the aircraft wing is designed primarily for other conventional purposes. In overwing thrust reversers, there is generally little available space between the exhaust nozzle and the wing in which to mount the actuator mechanisms which thus affects the ability to obtain efficient discharge of the exhaust gases from the exhaust nozzle.

Furthermore, in operation, the thrust reverser is typically deployed when an aircraft is landing and is rolling at relatively high speed. Therefore, it is subject to relatively high air velocity passing over the engine and wing which generates substantial aerodynamic pressure forces on the deflector which must be suitably accommodated for minimizing or preventing buffeting of the deflector during deployment. The forces due to the airflow over the engine during landing are in addition to the forces generated by the exhaust gases discharged from the engine exhaust nozzle against the deflector for thrust reversal, which must also be accommodated by the linkages attaching the deflector to the engine, nacelle, and/or wing. Such considerably large aerodynamic forces against the deflector generate substantial reaction loads in the actuation mechanism as well as generating reaction loads in the deflector. The deflector and actuation mechanisms must, therefore, be substantially rigid for accommodating these reaction loads without undesirable distortion of the deflector or of the actuation mechanisms.

OBJECTS OF THE INVENTION

Accordingly, one object of the present invention is to provide a new and improved thrust reverser for an overwing, aircraft mounted gas turbine engine.

Another object of the present invention is to provide a thrust reverser which is relatively compact and simple.

Another object of the present invention is to provide a thrust reverser utilizing a single deflector for obtaining thrust reversal.

Another object of the present invention is to provide a thrust reverser wherein the actuation means are disposed external to the aircraft wing for improving serviceability.

Another object of the present invention is to provide a thrust reverser which is effective for providing stable deployment of the deflector for accommodating aerodynamic pressure forces due to airflow and exhaust gases acting against the deflector during operation.

DISCLOSURE OF INVENTION

A thrust reverser is provided for a gas turbine engine and exhaust nozzle supported by an aircraft wing, the exhaust nozzle having an outlet for discharging exhaust gases over an outer surface of the wing. The thrust reverser in accordance with a preferred embodiment includes a deflector having forward and aft ends, and first and second sides joined together by a base. The deflector is positionable in a stowed position around the exhaust nozzle so that the aft end is disposed forward of the nozzle outlet for allowing substantially unobstructed discharge of the exhaust gases from the nozzle outlet, and in a deployed position for changing direction of the exhaust gases for thrust reversal. A torque bar is fixedly joined to the deflector first and second sides and has a longitudinal centerline axis. Means for rotatably joining the torque bar to the wing or the engine support pylon are provided along with the means for rotating the deflector about the torque bar centerline axis for positioning the deflector in the deployed and stowed positions.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 8 is a transverse sectional view of the deflector illustrated in FIG. 7 taken along line 8—8.

FIG. 11 is an end view, partly sectional, of the deflector support portion intermediate end connected to an actuator rod as illustrated in FIG. 10 taken along the line 11—11.

FIG. 12 is an end view, partly sectional, of a second embodiment of the deflector support portion intermediate end attached to an actuator rod as illustrated in FIG. 10 also taken along line 11—11.

MODE(S) FOR CARRYING OUT THE INVENTION

Figure 1:
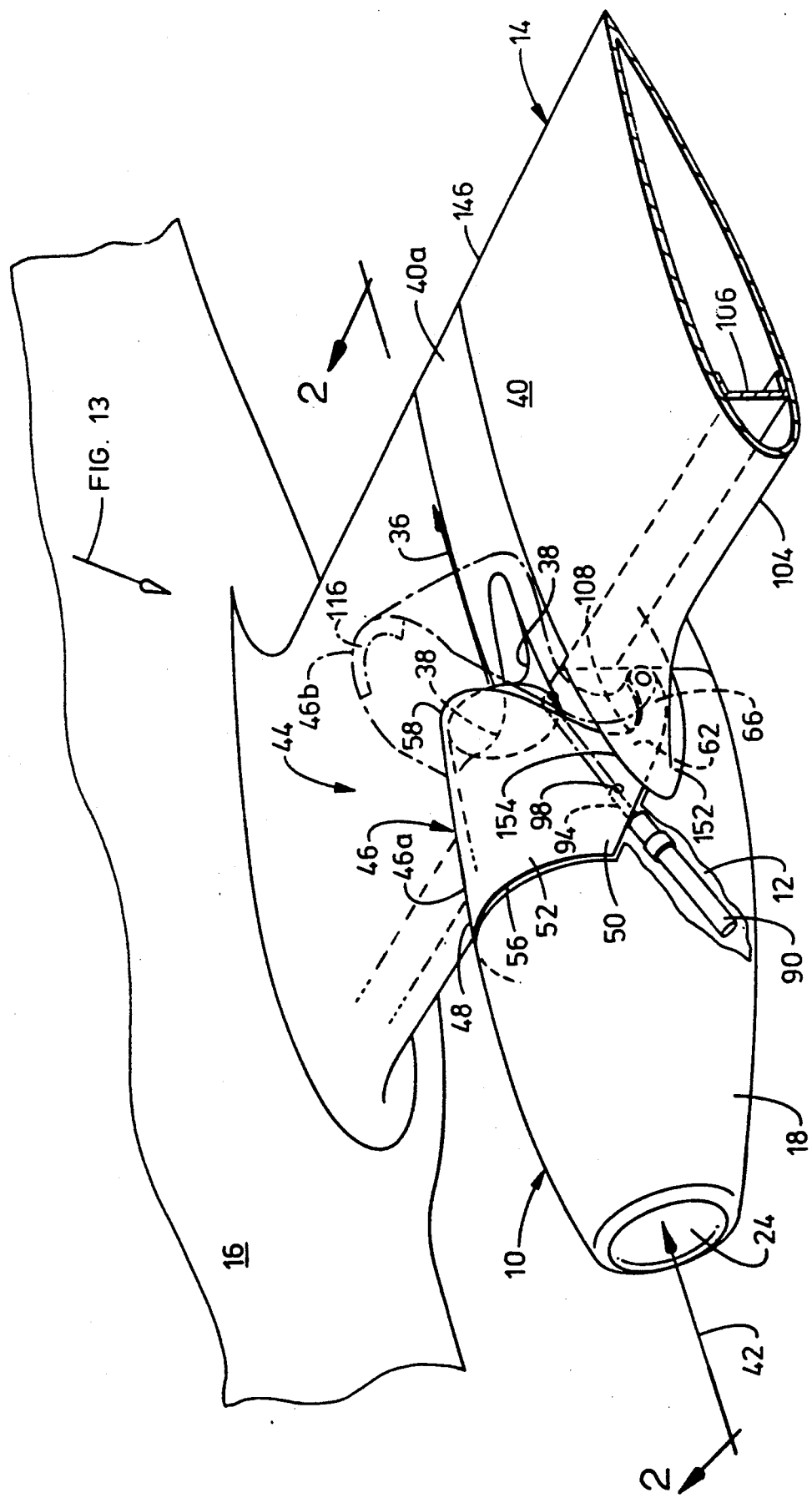
FIG. 1 is a perspective view of an exemplary turbofan gas turbine engine mounted over an aircraft wing and including a thrust reverser in accordance with one embodiment of the present invention.
Figure 2:
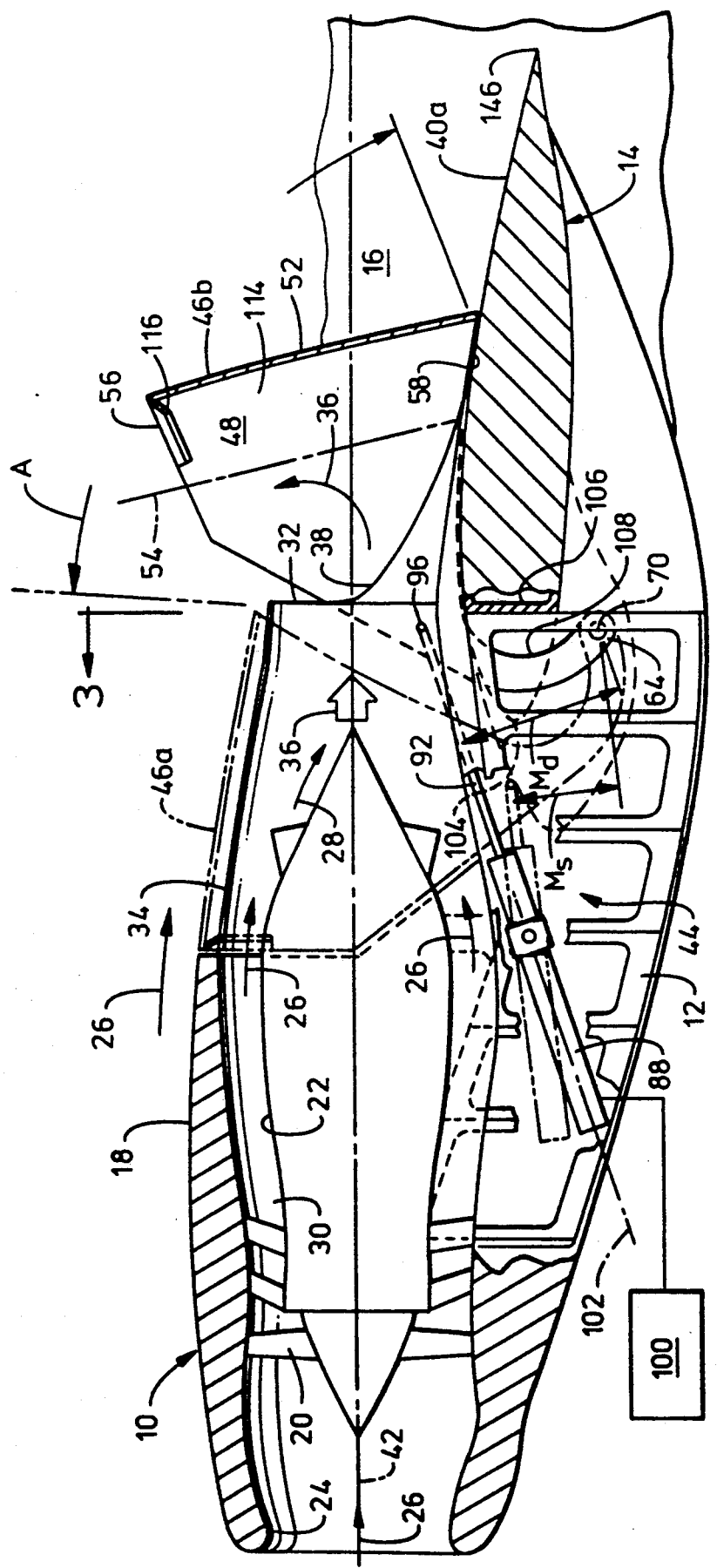
FIG. 2 is a longitudinal sectional view, partly schematic, taken through the engine, thrust reverser, and wing illustrated in FIG. 1 along line 2—2.

Illustrated in FIGS. 1 and 2 is an exemplary turbofan gas turbine engine 10 conventionally mounted by a pylon 12 over and partly forward of a wing 14 extending from an aircraft 16, only a portion of which is shown. The engine 10 is surrounded by a conventional nacelle 18 and includes a conventional fan 20 and core engine 22 therein. The engine 10 also includes an inlet 24 for receiving ambient air 26, a portion of which is channeled through the fan 20 and the core engine 22, wherein it is compressed and burned with fuel for generating combustion gases 28. A conventional bypass duct 30 surrounds the core engine 22 and channels a portion of the air 26 which is mixed with the combustion gases 28 and discharged through a conventional annular outlet 32 of an exhaust nozzle 34 as exhaust gases 36.

A fairing 38, also referred to as a sugar scoop fairing, forms a part of the nacelle 18 and extends from the nozzle outlet 32 in an aft direction for blending the exhaust nozzle 34 into an outer surface 40 of the wing 14. The fairing 38 is optional for more smoothly discharging the exhaust gases 36 from the nozzle outlet 32 and downstream over a heat shield 40a formed as part of the wing outer surface 40.

The engine 10 and exhaust nozzle 34 have a common axial centerline axis 42 extending therethrough which is disposed generally parallel to the wing 14 and the outer surface 40 thereof. During conventional operation of the engine 10, the exhaust gases 36 are channeled parallel to the engine centerline axis 42 through the exhaust nozzle 34 and rearwardly from the outlet 32 over the wing outer surface 40 as shown in solid line in FIG. 1.

When the aircraft 16 is landing, reversal of the exhaust gases 36 is obtained by a thrust reverser 44 in accordance with a preferred embodiment of the present invention. The reverser 44 includes a single, generally U-shaped deflector 46 having first and second transversely spaced apart generally flat sides 48 and 50, respectively. In FIG. 1, the deflector 46 is shown in solid line, designated 46a in its stowed position around the exhaust nozzle 32 and aerodynamically blended with the nacelle 18. It is shown in dashed line, designated 46b in its deployed position for obtaining thrust reversal. In FIG. 2, the deflector 46 is shown in dashed line in its stowed position 46a and in solid line in its deployed position 46b.

The deflector sides 48 and 50 are joined together by a base 52 which is arcuate in the transverse plane to define the generally U-shaped cross-section of the deflector 46. The deflector 46 includes a longitudinal axis 54, which is generally a centerline axis of the deflector 46. The base 52 extends between longitudinally spaced apart, open forward and aft opposite ends 56 and 58, respectively, of the deflector 46. Since the deflector 46 is generally U-shaped, each of the forward and aft ends 56 and 58 is also U-shaped.

The deflector first and second sides 48 and 50 include first and second support portions 60 and 62, respectively, disposed between the forward and aft ends 56 and 58. The deflector 46 is positionable in the stowed position 46a around the exhaust nozzle 34 so that the deflector aft end 58 is disposed forward of the nozzle outlet 32 and the fairing 38 for allowing substantially unobstructed discharge of the exhaust gases 36 from the nozzle outlet 32. The deflector 46 is also positionable in the deployed position 46b wherein the deflector aft end 58 is disposed adjacent to the heat shield 40a of the wing outer surface 40 and the deflector base 52 faces the exhaust outlet 32 for changing direction of the exhaust gases 36 for thrust reversal. The first and second support portions 60 and 62 include first and second proximal ends 64 and 66, respectively.

Figure 3:
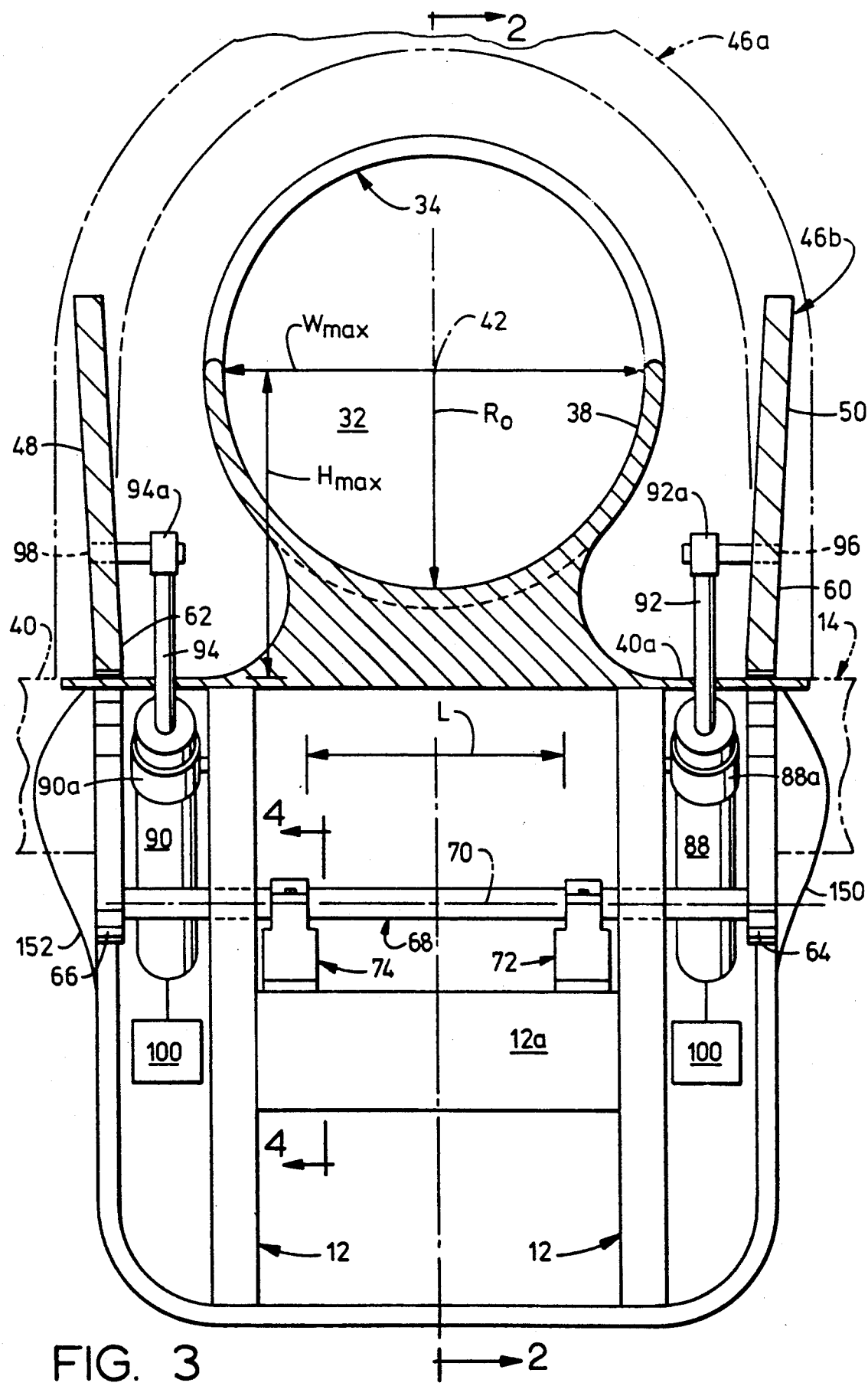
FIG. 3 is a transverse sectional view, partly schematic, of the thrust reverser illustrated in FIG. 2 taken along line 3—3.

In accordance with the present invention, an elongate torque bar 68, as illustrated in FIG. 3, is conventionally fixedly joined to and between the first and second deflector proximal ends 64 and 66. For example, the torque bar 68 may be welded or bolted thereto. The torque bar 68 is preferably in the form of a hollow tube and is substantially rigid for rigidly joining together the deflector first and second sides 48 and 50 at the first and second proximal ends 64 and 66. The torque bar 68 includes a longitudinal centerline axis 70 about which axis 70 the deflector 46 is pivotable, with the rigid torque bar 68 ensuring that both the first and second sides 48 and 50 of the deflector move in unison against the aerodynamic loading from the air 26 flowing over the nacelle 18 and the exhaust gases 36 which collectively impinge against the deflector 46 when it is in its deployed position 46b.

Figure 4:
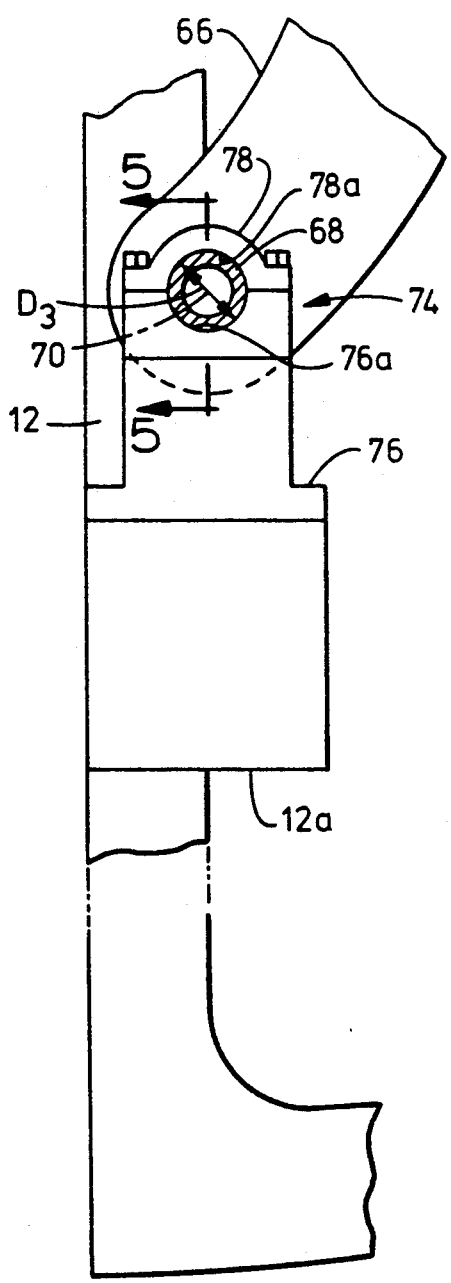
FIG. 4 is a longitudinal sectional view of portions of the thrust reverser deflector and supporting pylon illustrated in FIG. 3 taken along line 4—4.

As illustrated in FIGS. 3 and 4, the thrust reverser 44 further includes means in the form of first and second support blocks 72 and 74 for rotatably joining the torque bar 68, and the deflector 46, to the wing 14, and in particular to the pylon 12 supporting the engine 10 to the wing 14. The first and second blocks 72 and 74 are preferably longitudinally spaced apart as far as possible in the pylon 12, i.e. distance L in FIG. 3, and each is disposed adjacent to a respective first and second proximal end 64 and 66 of the deflector 46.

Figure 5:
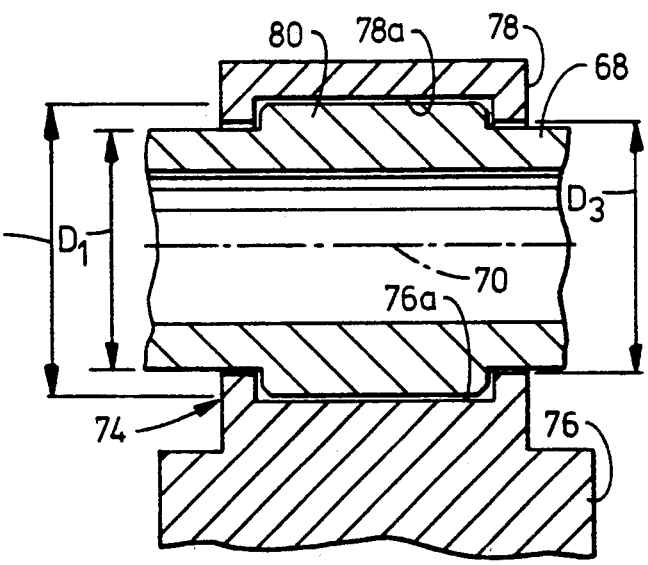
FIG. 5 is a transverse sectional view, partly schematic, of one embodiment of a support for mounting the deflector torque bar to the wing and pylon as illustrated in FIG. 4 taken along line 5—5.

As illustrated in more particularly in FIGS. 4 and 5, the support blocks 72 and 74 are identical and each includes a base 76 conventionally fixedly connected to a transverse brace 12a of the pylon 12. The base 76 may be bolted or welded to the brace 12a, and the brace 12a may be formed integrally with or bolted to the pylon 12. The base 76 includes an arcuate recess 76a for supporting the torque bar 68, and the blocks 72 and 74 further include a generally semi-circular cap 78 conventionally fixedly connected to the base 76 by conventional bolts, for example. The cap 78 has an arcuate recess 78a positioned over the torque bar 68 for constraining radial movement of the torque bar 68 while allowing rotation of the torque bar 68 about the torque bar centerline axis 70.

In one embodiment of the support blocks 72 and 74 as illustrated in FIG. 5, the torque bar 68 includes an integral boss 80 having an outer diameter $D_2$ which is greater than the outer diameter $D_1$ of the torque bar 68. The cap and base recesses 78a and 76a have a common diameter $D_3$ which is greater than the torque bar diameter $D_1$ and less than the boss diameter $D_2$. In the transverse section illustrated in FIG. 5, the base and cap recesses 76a and 78b have U-shaped transverse profiles which are complementary to the profile of the boss 80. In this way, the recesses 76a and 78a constrain both radial and longitudinal movement of the torque bar 68 while allowing rotation thereof about the longitudinal centerline 70. The cap 78 and the boss 80 are conventionally lubricated, for example with a coating of polytetrafluorethylene (Teflon, trademark) for minimizing maintenance.

Figure 6:
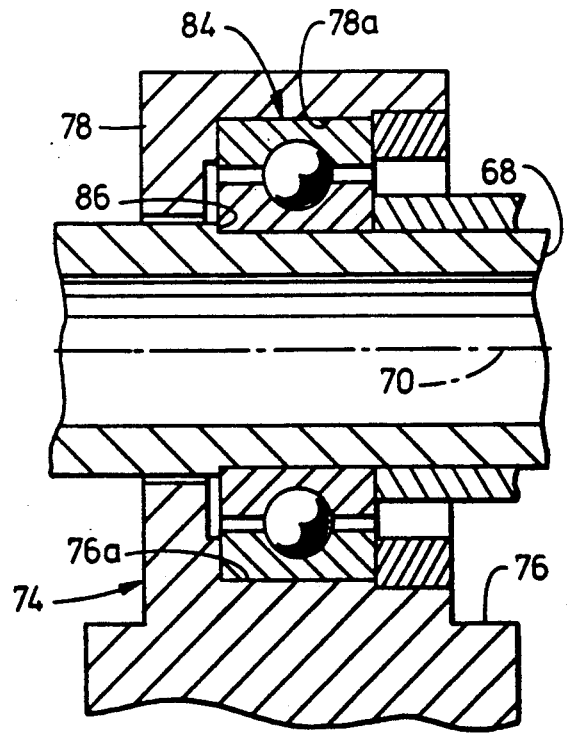
FIG. 6 is a transverse sectional view of a second embodiment of a support for mounting the deflector torque bar to the wing and pylon as illustrated in FIG. 4 also taken along line 5—5.

Illustrated in FIG. 6 is an alternate embodiment of the second support block 74 and the torque bar 68. In this embodiment, a conventional annular roller bearing 84 is conventionally joined to the outer diameter of the torque bar 68 against a shoulder 86 thereof. The recesses 76a and 78a are complementary in profile to the bearing 84 for fixedly mounting the outer race of the bearing 84 to the support block base 76. In this way, the bearing 84 allows the torque bar 68 to rotate about the centerline axis 70 while being restrained from any radial movement by the cap 78, and longitudinal movement is prevented by the shoulder 86.

Referring again to FIGS. 1-3, the thrust reverser 44 further includes means for rotating the deflector 46 about the torque bar centerline axis 70, or about the first and second proximal ends 64 and 66, for positioning the deflector 46 in the stowed and deployed positions 46a and 46b, and the positions anywhere thereinbetween. In the preferred embodiment of the present invention, the deflector rotating means comprises first and second conventional hydraulic, linear actuators 88 and 90, each including a retractable and extendable actuator rod 92 and 94, respectively, pivotally joined to respective ones of the deflector first and second support portions 60 and 62 at respective first and second intermediate ends 96 and 98, respectively. Each of the actuators 88 and 90 includes an intermediate flange 88a and 90a which conventionally pivotally joins the respective actuator 88 and 90 to the pylon 12. For example, the flanges 88a and 90a simply include a pin extending therefrom which extends into a complementary hole in the pylon 12 for rotation therein.

Each of the actuator rods 92 and 94 includes distal ends 92a and 94a which are conventionally pivotally joined to respective ones of the deflector first and second intermediate ends 96 and 98. The rod ends 92a and 94a may be conventionally spherical bearings conventionally including a pin fixedly joined to the intermediate ends 96 and 98.

Conventional control and hydraulic fluid supplying means 100 are conventionally operatively connected to the first and second actuators 88 and 90 for selectively extending and retracting the first and second actuator rods 92 and 94 for moving the deflector 46 between the stowed position 46a and the deployed position 46b.

As illustrated in FIGS. 1 and 2, the first and second actuators 88 and 90 preferably extend forwardly from the deflector 46 and the wing 14 and are effective for positioning the deflector 46 in the stowed position 46a upon retraction of the actuator rods 92 and 94, and in the deployed position 46b upon extension of the actuator rods 92 and 94. The first and second actuators 88 and 90 are also preferably positioned generally perpendicularly to the deflector base 52 and longitudinal axis 54 in the deflector deployed position 46b. More specifically, each of the actuators 88 and 90 includes a longitudinal axis 102 as illustrated in FIG. 2 which is disposed generally perpendicularly to the deflector longitudinal axis 54 in the deployed position 46b. In this way, the reaction loads from the exhaust gases 36 acting against the deflector 46 place the actuator rods 92 and 94 in tension which is effectively restrained by the forces generated by the actuators 88 and 90.

The thrust forces from the exhaust gases 36 tend to rotate the deflector 46 clockwise as illustrated in FIG. 2 about the first and second proximal ends 64 and 66, whereas the forces generated by the actuators 88 and 90 oppose such thrust forces. In the deflector deployed position 46b, each of the actuators 88 and 90 has a deployed moment arm $M_d$ measured perpendicularly between the longitudinal axis 102 of the actuator rod and the torque bar longitudinal axis 70. In the deflector stowed position 46a, the actuators 88 and 90 have a stowed moment arm $M_s$ disposed perpendicularly between the actuator longitudinal axis 102 and the torque bar centerline axis 70. In the preferred embodiment, the deployed moment arm $M_d$ is greater than the stowed moment arm $M_s$ to ensure that a maximum amount of torque is applied to the deflector 46 about the torque bar longitudinal axis 70 from the axial force generated by the actuators 88 and 90. Such torque is required to accommodate the opposing torque applied to the deflector 46 by the exhaust gases 36 and the airflow 26 during deployment of the deflector 46. By aligning the actuator longitudinal axis 102 perpendicularly to the deflector longitudinal axis 54, the deployed moment arm $M_d$ is a maximum moment arm since further rotation of the deflector 46 about the torque bar centerline axis 70 in either a clockwise or counterclockwise direction decreases the deployed moment arm $M_d$.

After the aircraft 16 has been suitably slowed in speed, the torque applied by exhaust gases 36 and the airflow 26 on the deflector 46 is substantially reduced, to zero for example, and therefore, less force is required to be generated by the actuators 88 and 90. The deflector 46 may then be retracted to its stowed position 46a wherein the stowed moment arm $M_s$ is less than the deployed moment arm $M_d$ since relatively little force need be supplied by the actuators 88 and 90 for retracting the deflector 46.

As illustrated in FIG. 2, the first actuator 88, as well as the second actuator 90, has substantially the same position when the deflector is in the deployed and stowed positions 46b and 46a, respectively. In the deflector deployed position 46b, the actuator 88 is shown in solid line, and in the stowed position 46a, the actuator 88 is shown in dashed line which is generally parallel to its position in the deployed position 46b. This positioning of the actuators 88 and 90, provides relatively high actuation forces to the deflector 46 during deployment as well as minimizes the rotational movement of the actuators 88 and 90 about their support flanges 88a and 90a. This also reduces the space requirement within the pylon 12 for accommodating the actuators 88 and 90.

Referring again to FIGS. 1 and 2, the wing 14 further includes a leading edge 104 and a conventional forward, leading edge spar 106 extending parallel to and spaced downstream from the leading edge 104. In the preferred embodiment of the present invention, it is desirable to not alter the wing 14 downstream of the forward spar 106 for accommodating the thrust reverser 44. Accordingly, the deflector first and second proximal ends 64 and 66 and the torque bar 68 are preferably disposed below the wing 14. The deflector first and second support portions 60 and 62 are spaced primarily forwardly from the forward spar 106 in both the deflector stowed and deployed positions 46a and 46b. In this way, the deflector 46 may be rotated by the actuators 88 and 90 about the torque bar centerline axis 70 without any of the thrust reverser mechanisms being disposed inside of the wing 14 aft of the forward spar 106.

However, a relatively large rotation of the deflector 46 about the centerline axis 70 is required for deploying the deflector 46 suitably aft of the exhaust nozzle outlet 32 to prevent the generation of undesirable back pressure on the exhaust gases 36 as well as for fully positioning the deflector aft end 58 against the heat shield 40a of the wing outer surface 40. As illustrated in FIG. 2, a relatively large rotation angle A of up to about 65° may be obtained by having arcuate deflector first and second support portions 60 and 62 each having an aft edge 108 which is generally concave for receiving the wing forward spar 106 in the deflector deployed position 46b. This also allows the deflector aft end 58 to be positioned closely adjacent to the heat shield 40a in the deployed position 46b, while also allowing the deflector to be positioned in its fully stowed position 46a coextensively with the nacelle 18. The deflector aft end 58 is preferably disposed about 0.25 inch (0.63 cm) from the heat shield 40a for providing effective thrust reversal without imparting stress in the heat shield 40a.

Figure 7:
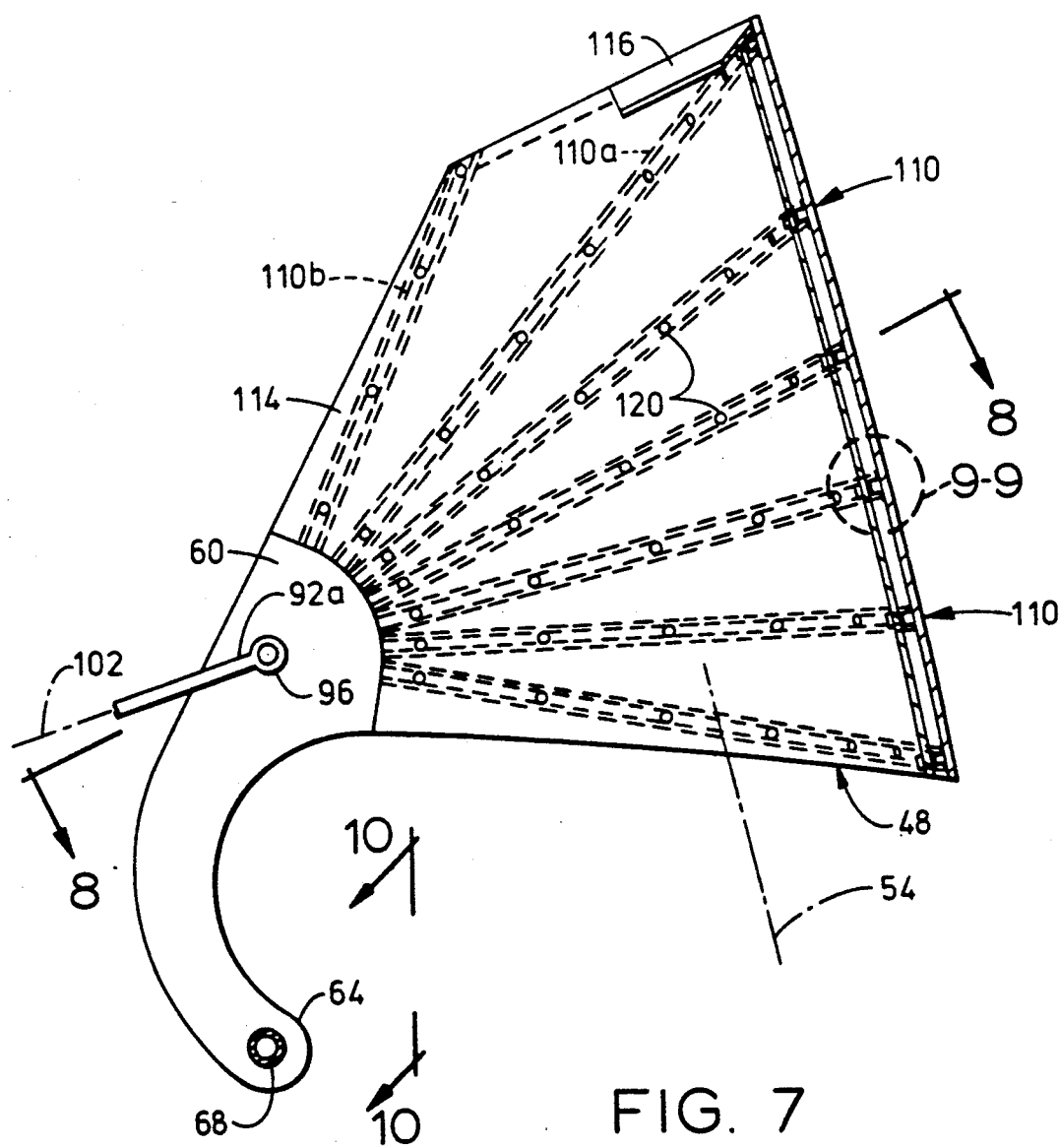
FIG. 7 is a longitudinal, centerline sectional view of the thrust reverser deflector illustrated in FIG. 2.

As illustrated in FIGS. 7 and 8, the deflector base 52 and the first and second sides 48 and 50 comprise a plurality of longitudinally spaced apart stiffening ribs 110. The ribs 110 allow the deflector 46 to be relatively lightweight while providing structural rigidity for accommodating aerodynamic and actuation loads during operation. The ribs 110 include an arcuate portion 110a having a suitably varying radius R relative to the deflector longitudinal axis 54 and extend circumferentially along the deflector base 52, and generally straight portions 110b extending along the deflector sides 48 and 50. The rib straight portions 110b preferably radiate outwardly from the actuator rod ends 92a, 94a for collectively providing a resultant load path for the aerodynamic thrust reversal loads which is generally parallel to the actuator longitudinal axis 102 in the deflector deployed position 46b. The actuators 88, 90, therefore accommodate most of the thrust reversal forces imposed on the deflector 46, with the torque bar 68 accommodating any unbalance loads induced by moments.

The deflector 46 also includes a conventional outer skin 112 conventionally fixedly joined to the outer side of the ribs 110 by conventional rivets, for example. An inner skin 114 is joined to the inner side of the ribs 110 as described in more detail below for providing a flow boundary surface for the exhaust gases 36 and for protecting the ribs 110 and the outer skin 112.

A conventional kicker plate 116 may also be provided as illustrated in FIGS. 1 and 2. The kicker plate 116, for example, may be fixedly joined to the deflector forward end 56 and protrude radially inwardly from the deflector base 52 to conventionally provide additional turning of the exhaust gases 36 in the upstream direction.

Figure 9:
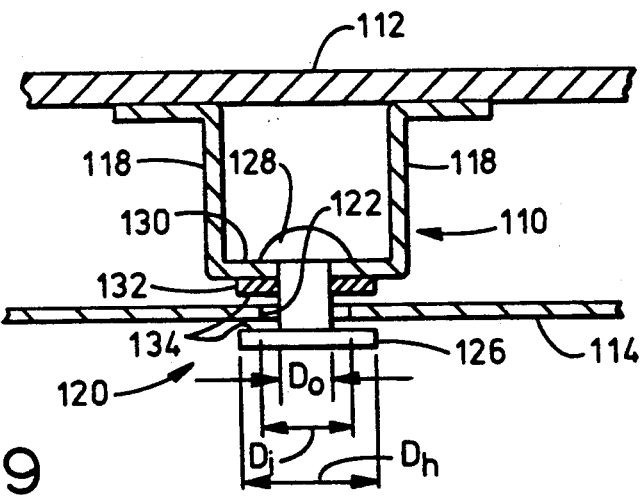
FIG. 9 is a transverse sectional view of a portion of the deflector including a stiffening rib as illustrated in FIG. 7 within the dashed circle labeled 9—9.

As illustrated in more particularity in FIG. 9, the stiffening ribs 110 have two spaced apart L-shaped legs and a hat-type transverse sectional profile. Alternatively, one of the L-shaped legs 118 of the ribs 110 may be removed so that the ribs 110 have a Z-type transverse sectional profile for further reducing weight wherein the additional rigidity from the removed leg 118 is not required in particular applications.

The inner skin 114 faces the exhaust nozzle outlet 32 as illustrated in FIG. 2 when the deflector 46 is in the deployed position 46b for turning the exhaust gases 36 discharged from the nozzle outlet 32. The inner skin 114 is therefore preferably joined to the ribs 110 by a plurality of thermal, slip joints 120 as illustrated in FIG. 7, and in more particularity in FIG. 9. Each of the slip joints 120 allows for differential thermal transverse movement between the inner skin 114 and the ribs 110 while preventing the inner skin 114 from separating from the ribs 110. Since the inner skin 114 faces the exhaust gases 36, it acts as a heat shield to protect the ribs 110 and the outer skin 112 from the relatively hot temperatures of the exhaust gases 36, and is preferably made from a conventional medium temperature material such as, for example, titanium 6-4.

Each of the slip joints 120 preferably includes the inner skin 114 having an aperture 122 having an inner diameter $D_i$. The joints 120 also include a fastening pin 124, such as a conventional rivet, which includes an outer diameter $D_o$; an integral head 126 having a head diameter $D_h$; and a distal end 128. The pin 124 is positioned in the inner skin aperture 122 with the distal end 128 being conventionally fixedly joined to a web 130 of the rib 110, which web 130 is formed integral with the two legs 118. The head 126 is disposed adjacent to the inner skin 114, with the aperture inner diameter $D_i$ being less than the head diameter $D_h$ and greater than the pin outer diameter $D_o$ for allowing transverse sliding movement of the inner skin 114 relative to the rib 110 for accommodating differential thermal movement therebetween. The skin 114 can predeterminedly move until the aperture 122 contacts the outer diameter $D_0$ of the pin 124. In the preferred embodiment, the slip joint 120 further includes a wear washer 132 positioned around the pin 124 and between the inner skin 114 and the web 130. The wear washer 132 may be a conventional metal such as Nitronic 60, for example. Also in the preferred embodiment, a conventional wear coating 134 such as CuNiIn, for example, is coated on the pin head 126 and the wear washer 132 on the sides thereof facing the inner skin 114 for reducing wear between the pin head 126 and the washer 132 with the inner skin 114.

Figure 10:
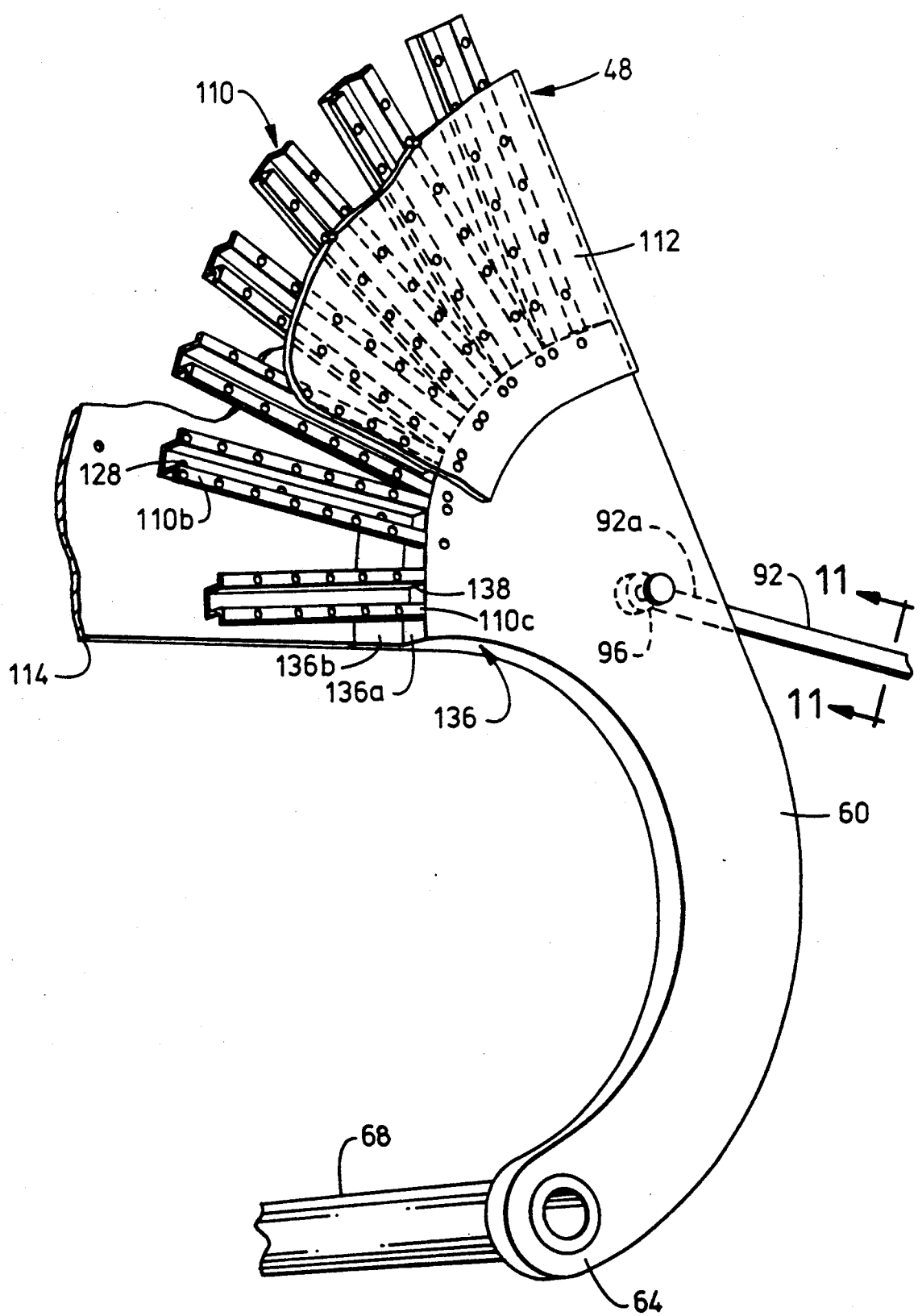
FIG. 10 is a perspective, partly sectional view of a portion of the deflector illustrated in FIGS. 7 and 8 taken generally along the line 10—10.

As illustrated in FIG. 10, the first side portion 60, as well as the second portion 62 which is identical thereto, includes a distal end 136 which in this exemplary embodiment is L-shaped and has a floor 136a and a wall 136b. The ribs 110 which radiate outwardly from the first intermediate end 96 include ends 110c which are conventionally fixedly joined to the support portion 60 distal ends 136, for example at the distal end floor 136a by a conventional braze material 138, for example. The rib ends 110c are also preferably fixedly connected to the distal end wall 136b also by brazing or by being riveted thereto for providing a rigid support between the ribs 110 and the support portion 60. In the preferred embodiment, the outer skin 112 overlaps the support portion 60, and the inner skin 114 is disposed coextensively with the distal end wall 136b.

The first and second support portions 60 and 62 as above described, are preferably integral members being either a cast or forged structure. The rigid joining of the ribs 110 to the support portion distal end 136 provides an effective structural path for transferring the thrust forces from the exhaust gases 36 and the airflow 26 through the deflector base 52 and first and second sides 48 and 50 to the first and second support portions 60 and 62. Furthermore, the first and second support portions 60 and 62 are fixedly joined together by the torque bar 68 thus providing a relatively rigid assembly. Accordingly, the thrust forces transferred in part through the first and second support portions 60 and 62 are channeled through the first and second proximal ends 64 and 66 and through the torque bar 68 and the first and second support blocks 72 and 74 to the pylon 12 through the brace 12a.

As illustrated in FIGS. 10-12, the first actuator rod end 92a, and similarly the second actuator rod end 94a, is pivotally connected to the support portion 60 at the first intermediate end 96. As described above, the actuator rod end 92a may comprise a conventional spherical rod end suitably including a conventional pin 142 fixedly connected to the first support portion 60 at the first intermediate end 96 as illustrated in FIG. 11.

FIG. 12 illustrates the preferred embodiment of joining the first actuator rod end 92 to the first support portion 60. In this embodiment, a pocket receptacle 140 is formed in the forward facing surface of the first support portion 60 at the first intermediate end 96 and the first actuator rod end 92a is disposed therein. A conventional pin 142 extends through the first intermediate end 96 and through the spherical rod end of the first actuator rod end 92a in the receptacle 140 for pivotally supporting the actuator rod 92 to the first support portion 60. The pocket receptacle 140 has a predetermined height for accommodating pivotal movement of the actuator rod 90 as the deflector 46 is moved between the stowed and deployed positions 46a and 46b.

Figure 13:
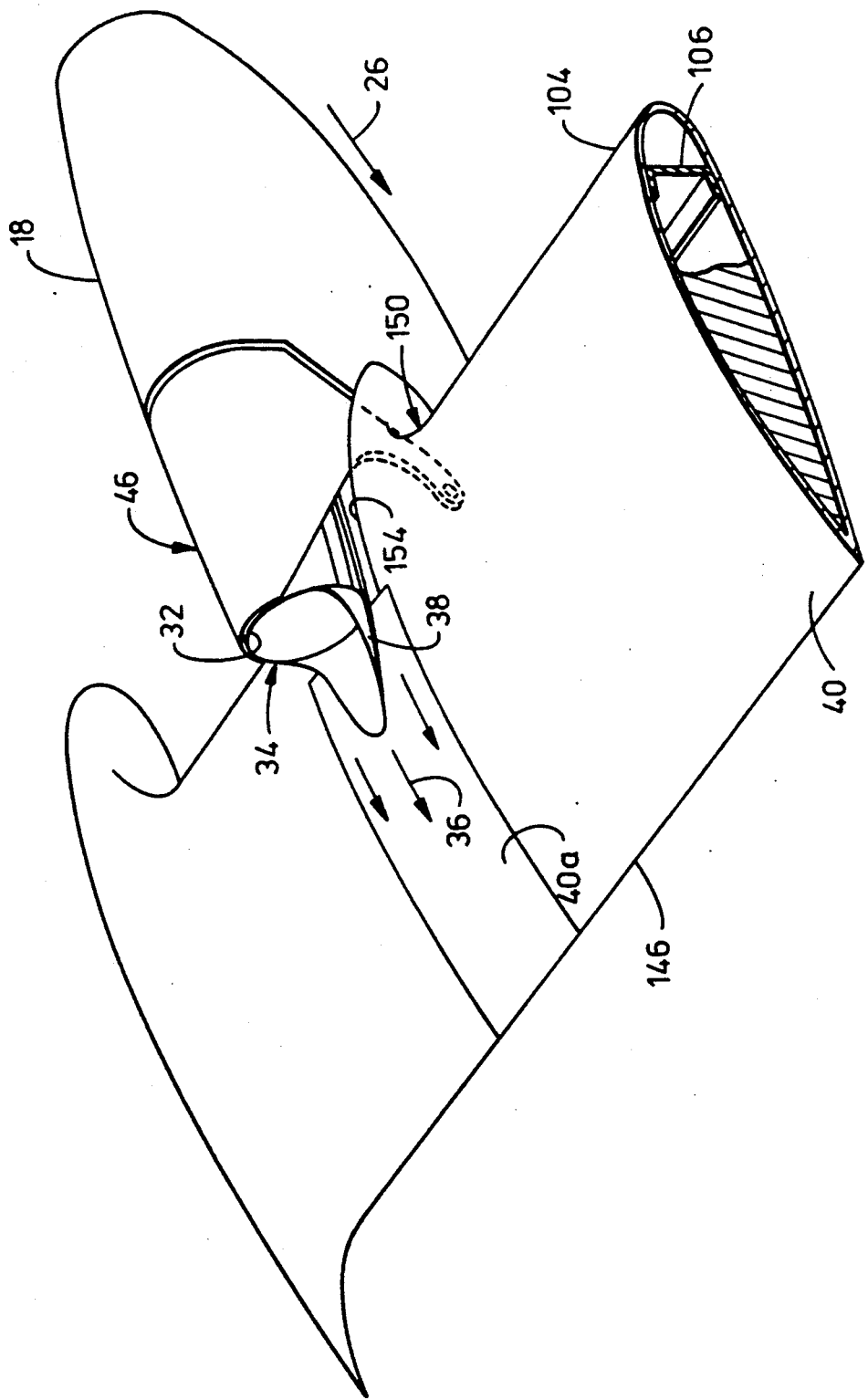
FIG. 13 is a perspective, partly sectional view of the wing, thrust reverser, and engine illustrated in FIG. 1 taken in a generally upstream facing direction along line 13—13.

As illustrated in FIG. 13, the thrust reverser 44 in accordance with one embodiment of the present invention preferably includes the heat shield 40a conventionally fixedly joined to the wing 14, for example by a plurality of conventional rivets, for forming a portion of the outer surface 40 thereof. The heat shield 40a extends downstream from the exhaust nozzle outlet 32 and preferably to a trailing edge 146 of the wing 14. The heat shield is preferably made from titanium 6-4, for example, for protecting the wing 14 from the relatively hot exhaust gases 36. In accordance with a preferred embodiment of the invention, the heat shield 40a further includes the fairing 38 suitably joined thereto as illustrated in FIGS. 3 and 13 which has a maximum height $H_{max}$ at the nozzle outlet 32 and extends downstream from the nozzle outlet 32 and blends with the heat shield 40a downstream from the nozzle outlet 32. The fairing 38 therefore extends outwardly from the heat shield 40a from the maximum $H_{max}$ to a minimum height of zero coextensively with the heat shield 40a. The fairing 38 also has a maximum width $W_{max}$ at the maximum height position $H_{max}$, with the width of the fairing decreasing to a zero width where the fairing 38 blends with the remainder of the heat shield 40a. The fairing 38 is preferably provided for allowing the exhaust gases 36 to more efficiently aerodynamically flow from the circular exhaust nozzle 32 to the substantially flat wing outer surface 40 over the heat shield 40a. In the preferred embodiment, the fairing 38 has a concave outer surface with a radius $R_0$ at its upstream end ($H_{max}$), as shown in FIG. 3, which is substantially equal to the radius of the exhaust nozzle outlet 32. In this way, the exhaust gases 36 discharged from the outlet 32 when the deflector is in the stowed position 46a are discharged with improved efficiency.

As illustrated in FIGS. 1, 3, and 13, the thrust reverser 44 preferably further includes first and second deflector fairings 150 and 152 which extend upstream from the leading edge 104 of the wing 14 for covering the deflector first and second support portions 60 and 62, respectively, when the deflector is in both the deployed and stowed positions 46b and 46a. Since during deployment of the deflector 46, the first and second support portions 60 and 62 move upwardly along the side surfaces of the sugar scoop fairing 38 and over the wing 14, they are generally within the flowstream of the air 26 being channeled over the nacelle 18 in a downstream direction. The fairings 150 and 152 provide an aerodynamic transition for blending the wing 14 at its leading edge 104 to the deflector 46 for improving aerodynamic efficiency of the air 26 flowing past the deflector 46.

As illustrated in FIGS. 1 and 13, the fairings 150 and 152 also blend with the wing 14 to define in part a portion of slots 154 between the sugar scoop fairing 38 and the wing 14 upstream of the forward spar 106. The slots 154 allow for increased rotation of the deflector 46 from the stowed position 46a to the deployed position 46b by receiving the deflector first and second support portions 60 and 62 therein.

Figure 14:
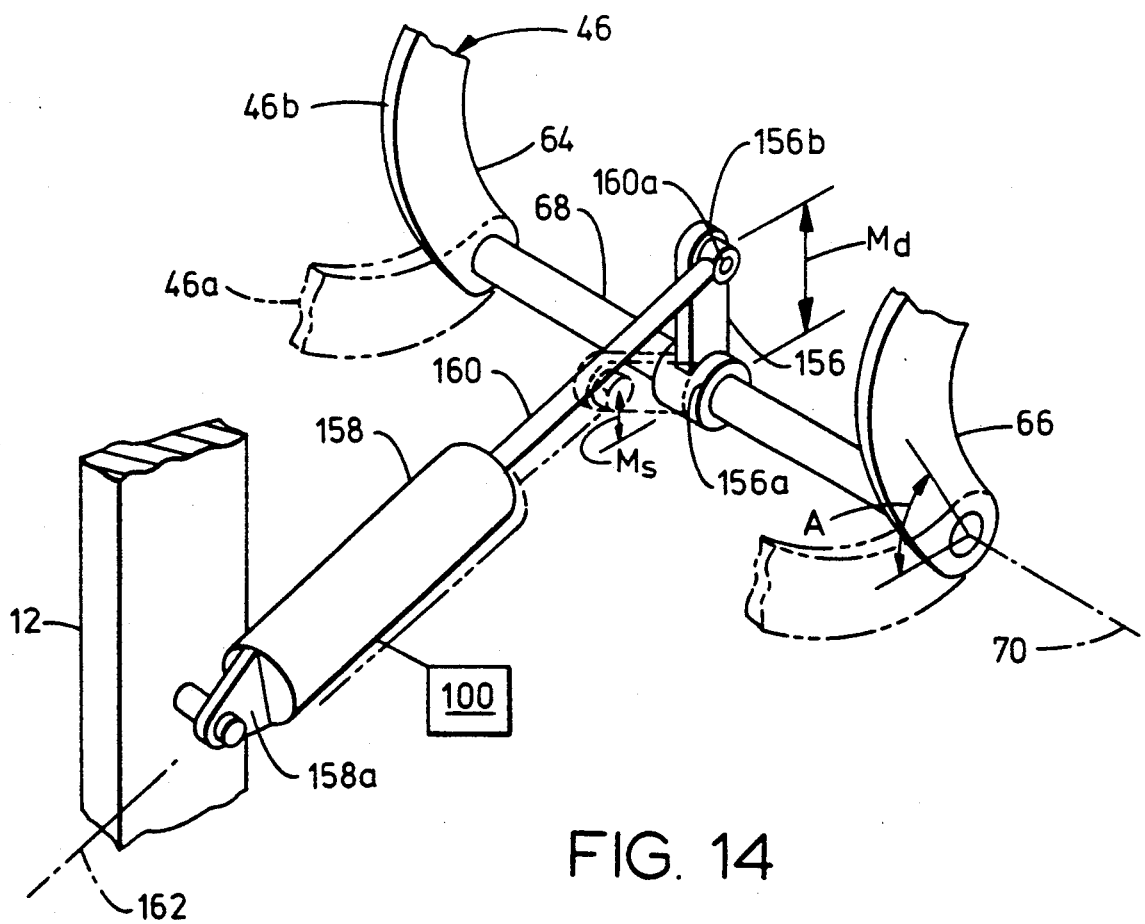
FIG. 14 is a perspective, partly sectional and schematic view of a second embodiment of means for rotating the deflector illustrated in FIG. 1.

Illustrated in FIG. 14 is an alternate embodiment of the means for rotating the deflector 46. The thrust reverser 44 is otherwise identical to the reverser illustrated in FIG. 3 including the first and second support blocks 72 and 74 which have been deleted from FIG. 14 for clarity. The deflector rotating means includes a bellcrank 156 having a proximal end 156a conventionally fixedly joined to the torque bar 68, for example by being keyed thereto. The bellcrank 156 also includes a distal end 156b disposed perpendicularly outwardly from the torque bar 68 and the centerline axis 70. A conventional hydraulic, linear actuator 158 has a proximal end 158a conventionally pivotally joined to the pylon 12 for example, by a conventional pin. The actuator 158 also includes an actuator rod 160 having a distal end 160a conventionally pivotally joined to the bellcrank distal end 156b by a spherical rod bearing, for example.

The actuator rod 160 is conventionally retractable and extendable by selectively providing pressurized fluid thereto from the conventional control means 100 for rotating the torque bar 68 for positioning the deflector 46 in the stowed and deployed positions 46a and 46b. In the preferred embodiment, the actuator 158 extends in an upstream direction from the deflector 46 and is effective for positioning the deflector 46 in the stowed position 46a upon retraction of the actuator rod 160, and in the deployed position 46b upon extension of the actuator rod 160.

The actuator 158 has a longitudinal centerline axis 162 and includes a stowed moment arm $M_s$ disposed perpendicularly between the actuator rod 160, or the centerline axis 162, and the torque bar centerline axis 70 in the deflector stowed position 46b. In the deflector deployed position 46b, the actuator 158 has a deployed moment arm $M_d$ measured between the actuator rod and the centerline axis 70, and the deployed moment arm $M_d$ is preferably greater than the stowed moment arm $M_s$. In this embodiment, the deployed moment arm $M_d$ is preferably a maximum moment arm which is obtained by ensuring that the actuator rod 160 is disposed perpendicularly to the bellcrank 156 in the deflector deployed position 46b.

Figure 15:
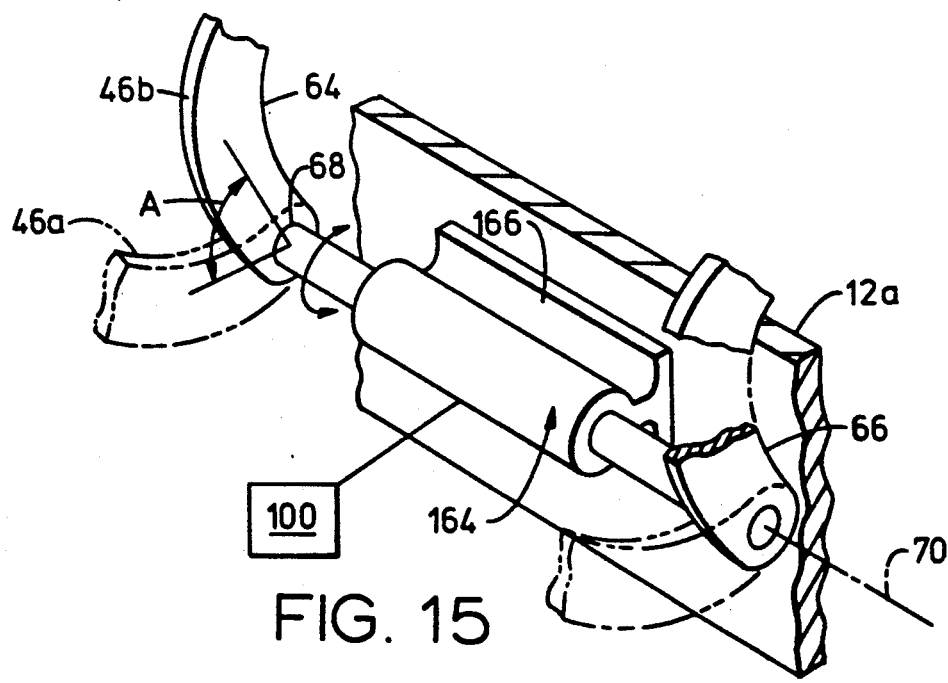
FIG. 15 is a perspective, partly sectional and schematic view of a third embodiment of means for rotating the deflector illustrated in FIG. 1.

Illustrated in FIG. 15 is a third embodiment of the deflector rotating means which includes an identical deflector 46 as in the previous two embodiments, and wherein the first and second support blocks 72 and 74 are not utilized but are replaced by a stationary conventional rotary hydraulic actuator 164 joined coaxially with the torque bar 68 for rotating the torque bar 68 for positioning the deflector 46 in the stowed and deployed positions 46a and 46b. The rotary actuator 164 includes a base 166 conventionally fixedly supported to the pylon brace 12a, for example by being bolted thereto. In this embodiment, the rotary actuator 164 is effective for both rotating the deflector 46 between the stowed and deployed positions 46a and 46b as well as channeling the reaction loads from the exhaust gases and airflow over the deflector 46 during deployment to the pylon 12 directly through the actuator 164 and the base 166 thereof. The rotary actuator 164 could, alternatively, be fixedly secured directly to the forward spar 106 of the wing.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention. For example, conventional air-motor, flexible shaft driven screw jacks, and other actuators could be used instead of the ones described above.

Accordingly, what is desired to be secured by Letters Patent of the United States is the invention as defined and differentiated in the following claims.

I claim:

1. A thrust reverser for a gas turbine engine supported by a pylon to a wing, the engine being effective for discharging exhaust gases from an outlet of an exhaust nozzle thereof over a surface of the wing, comprising:

a generally U-shaped deflector having first and second spaced apart sides joined together by a base, and spaced apart open forward and aft ends, said first and second sides including first and second support portions, respectively, disposed between said forward and aft ends, said deflector first and second support portions including first and second proximal ends, respectively, and said deflector being positionable in a stowed position around said exhaust nozzle so that said deflector aft end is disposed forward of said nozzle outlet for allowing substantially unobstructed discharge of said exhaust gases from said nozzle outlet, and in a deployed position for changing direction of said exhaust gases for thrust reversal;

a torque bar fixedly joined to said first and second proximal ends and having a longitudinal centerline axis;

means for rotatably joining said torque bar to said wing;

means for rotating said deflector about said torque bar centerline axis for positioning said deflector in said deployed and stowed positions.

2. A thrust reverser according to claim 1 wherein said deflector rotating means comprises first and second actuators pivotally joined to said pylon and each including a retractable and extendable actuator rod pivotally joined to respective ones of said deflector first and second support portions at intermediate ends thereof.

3. A thrust reverser according to claim 2 wherein said first and second actuators extend forwardly from said deflector and said wing and are effective for positioning said deflector in said stowed position upon retraction of said actuator rods and in said deployed position upon extension of said actuator rods.

4. A thrust reverser according to claim 3 wherein said first and second actuators are positioned generally perpendicularly to said deflector base in said deflector deployed position.

5. A thrust reverser according to claim 4 wherein said first and second actuators have substantially the same positions when said deflector is in said deployed and stowed positions.

6. A thrust reverser according to claim 2 wherein each of said first and second actuators has a stowed moment arm $M_s$ disposed perpendicularly between said actuator rod and said torque bar centerline axis in said deflector stowed position, and a deployed moment arm $M_b$ in said deflector deployed position, and said deployed moment arm $M_d$ is greater than said stowed moment $M_s$.

7. A thrust reverser according to claim 6 wherein said deployed moment arm $M_d$ is a maximum moment arm.

8. A thrust reverser according to claim 1 wherein said deflector rotating means comprises:

a bellcrank having a proximal end fixedly joined to said torque bar, and a distal end disposed perpendicularly outwardly from said torque bar;

an actuator pivotally joined to said pylon and including an actuator rod pivotally joined to said bellcrank distal end; and said actuator rod being retractable and extendable for rotating said torque bar for positioning said deflector in said stowed and deployed positions.

9. A thrust reverser according to claim 8 wherein said actuator is effective for positioning said deflector in said stowed position upon retraction of said actuator rod and in said deployed position upon extension of said actuator rod.

10. A thrust reverser according to claim 8 wherein said actuator has a stowed moment arm $M_s$ disposed perpendicularly between said actuator rod and said torque bar centerline axis in said deflector stowed position, and a deployed moment arm $M_d$ in said deflector deployed position, and said deployed moment arm $M_d$ is greater than said stowed moment arm $M_s$.

11. A thrust reverser according to claim 8 wherein said deployed moment arm $M_d$ is a maximum moment arm.

12. A thrust reverser according to claim 1 wherein said deflector rotating means comprises:
 a stationary rotary actuator joined coaxially with said torque bar for rotating said torque bar for positioning said deflector in said deployed and stowed positions.

13. A thrust reverser according to claim 12 wherein said rotary actuator includes a base fixedly connected to said pylon.

14. A thrust reverser according to claim 1 wherein said torque bar joining means comprises first and second longitudinally spaced apart support blocks each including:
 a base fixedly connected to a transverse brace of said pylon, and including an arcuate recess for supporting said torque bar; and
 a cap having an arcuate recess positioned over said torque bar and fixedly connected to said base for constraining radial movement of said torque bar while allowing rotation of said torque bar about said torque bar centerline axis.

15. A thrust reverser according to claim 14 wherein said joining means further comprises an annular roller bearing positioned around said torque bar and in each of said recesses of said caps and bases of said first and second blocks.

16. A thrust reverser according to claim 14 wherein said torque bar includes an integral boss having a diameter greater than a diameter of said torque bar, and said cap and base recesses have a common diameter greater than said torque bar diameter and less than said boss diameter.

17. A thrust reverser according to claim 1 wherein:
 said wing further includes a leading edge and a forward spar extending parallel to said leading edge;
 said deflector first and second proximal ends and said torque bar are disposed below said wing; and
 said deflector first and second support portions are spaced forwardly from said forward spar in both said deflector stowed and deployed positions.

18. A thrust reverser according to claim 17 wherein said deflector first and second support portions are arcuate, each having an aft edge being concave for receiving said wing forward spar in said deflector deployed position and allowing said deflector aft end to be positioned adjacent to said wing outer surface.

19. A thrust reverser according to claim 1 wherein said deflector further comprises:
 a longitudinal axis disposed generally parallel to said base;
 said base and said first and second sides comprising a plurality of longitudinally spaced apart stiffening ribs having arcuate portions extending along said base and generally straight portions extending along said sides;
 an outer skin fixedly joined to said ribs; and
 an inner skin joined to said ribs and spaced from said outer skin.

20. A thrust reverser according to claim 19 wherein said stiffening ribs have a hat-type transverse sectional profile.

21. A thrust reverser according to claim 19 wherein said first and second side support portions each includes a distal end, and said ribs include ends fixedly joined to said support portion distal ends.

22. A thrust reverser according to claim 21 wherein said support portion distal end is L-shaped and has a floor and a wall, and said rib ends are fixedly joined to said floor.

23. A thrust reverser assembly according to claim 22 wherein said inner skin is disposed coextensively with said distal end wall.

24. A thrust reverser according to claim 21 wherein said first and second side support portions each further includes an intermediate end for being joined to a distal end of an actuator rod of said deflector rotating means.

25. A thrust reverser according to claim 24 wherein said support portion intermediate end includes a pocket receptacle and said actuator rod distal end is pivotally joined therein to said deflector.

26. A thrust reverser according to claim 24 wherein said support portion intermediate end includes a fastening pin pivotally joining said actuator rod distal end to said deflector.

27. A thrust reverser according to claim 19 wherein said inner skin faces said exhaust nozzle outlet when said deflector is in said deployed position for turning said exhaust gases discharged from said nozzle outlet, and said inner skin is joined to said ribs by a plurality of slip joints allowing differential thermal transverse movement between said inner skin and said ribs.

28. A thrust reverser according to claim 27 wherein each of said slip joints comprises:
 said inner skin including an aperture having an inner diameter $D_i$;
 a fastening pin including an outer diameter $D_o$, an integral head having a head diameter $D_h$, and a distal end; and
 said pin being positioned in said inner skin aperture with said distal end fixedly joined to said rib, and said head being disposed adjacent to said inner skin, with said aperture inner diameter $D_i$ being less than said head diameter $D_h$ and greater than said pin outer diameter $D_o$ for allowing transverse sliding movement of said inner skin relative to said rib for accommodating differential thermal movement therebetween.

29. A thrust reverser according to claim 28 wherein said slip joint further includes a wear washer disposed between said inner skin and said rib.

30. A thrust reverser according to claim 29 wherein said pin head and wear washer include a wear coating for reducing wear between said pin head and washer and said inner skin.

31. A thrust reverser according to claim 1 further including a heat shield joined to said wing and extending downstream from said exhaust nozzle outlet for protecting said wing from said exhaust gases.

32. A thrust reverser according to claim 31 wherein said heat shield further includes a tapered fairing extending from said nozzle outlet and blending with said heat shield downstream from said nozzle outlet.

33. A thrust reverser according to claim 32 wherein said fairing has a concave outer surface and a radius at its upstream end which is equal to the radius of said exhaust nozzle outlet.

34. A thrust reverser according to claim 1 further including two fairings extending upstream from a leading edge of said wing for covering said deflector first and second support portions, respectively, when said deflector is in both said deployed and stowed positions.

35. A thrust reverser according to claim 1 wherein:
said deflector rotating means comprises first and second actuators pivotally joined to said pylon and each including a retractable and extendable actuator rod pivotally joined to respective ones of said deflector first and second support portions at intermediate ends thereof;
said wing further includes a leading edge and a forward spar extending parallel to said leading edge;
said deflector first and second proximal ends and said torque bar are disposed below said wing;
said deflector first and second support portions are spaced forwardly from said forward spar in both said deflector stowed and deployed positions; and
wherein said deflector further comprises:
a longitudinal axis disposed generally parallel to said base;
said base and said first and second sides comprising a plurality of longitudinally spaced apart stiffening ribs having arcuate portions extending along said base and generally straight portions extending along said sides;
an outer skin fixedly joined to said ribs; and
an inner skin joined to said ribs and spaced from said outer skin.

36. A thrust reverser according to claim 35 wherein:
said first and second actuators extend forwardly from said deflector and said wing and are effective for positioning said deflector in said stowed position upon retraction of said actuator rods and in said deployed position upon extension of said actuator rods;
said deflector first and second support portions are arcuate, each having an aft edge being concave for receiving said wing forward spar in said deflector deployed position and allowing said deflector aft end to be positioned adjacent to said wing outer surface; and
said deflector first and second side support portions each further includes a distal end, and said ribs include ends fixedly joined to said support portion distal ends.

37. A thrust reverser according to claim 36 wherein:
said torque bar joining means comprises first and second longitudinally spaced apart support blocks each including:
a base fixedly connected to a transverse brace of said pylon, and including an arcuate recess for supporting said torque bar; and
a cap having an arcuate recess positioned over said torque bar and fixedly connected to said support block base for constraining radial movement of said torque bar while allowing rotation of said torque bar about said torque bar centerline axis; and
said inner skin faces said exhaust nozzle outlet when said deflector is in said deployed position for turning said exhaust gases discharged from said nozzle outlet, and said inner skin is joined to said ribs by a plurality of slip joints allowing differential thermal transverse movement between said inner skin and said ribs.

* * * * *